(12) United States Patent
Lai et al.

(10) Patent No.: US 11,762,262 B1
(45) Date of Patent: Sep. 19, 2023

(54) CAVITY-ENHANCED FREQUENCY MIXER FOR CLASSICAL AND QUANTUM APPLICATIONS

(71) Applicant: HC Photonics Corporation, Hsinchu (TW)

(72) Inventors: Jui-Yu Lai, Hsinchu (TW); Christophe Le Touze, Hsinchu (TW); Ming-Hsien Chou, Hsinchu (TW)

(73) Assignee: HC PHOTONICS CORPORATION, Hsinchu (TW)

( * ) Notice: Subject to any disclaimer, the term of this patent is extended or adjusted under 35 U.S.C. 154(b) by 0 days.

(21) Appl. No.: 17/827,474

(22) Filed: May 27, 2022

(51) Int. Cl.
*G02F 1/39* (2006.01)
*G02F 1/355* (2006.01)
*G02F 1/35* (2006.01)

(52) U.S. Cl.
CPC .............. *G02F 1/395* (2013.01); *G02F 1/353* (2013.01); *G02F 1/3503* (2021.01); *G02F 1/3505* (2021.01); *G02F 1/3551* (2013.01); *G02F 1/3558* (2013.01); *G02F 2201/02* (2013.01); *G02F 2201/307* (2013.01); *G02F 2202/20* (2013.01)

(58) Field of Classification Search
CPC ...... G02F 1/3503; G02F 1/3505; G02F 1/353; G02F 1/3551; G02F 1/3558; G02F 1/395; G02F 2201/02; G02F 2201/307; G02F 2202/20
See application file for complete search history.

(56) References Cited

U.S. PATENT DOCUMENTS

2010/0208757 A1* 8/2010 Hu .................. G02F 1/3558
204/164

FOREIGN PATENT DOCUMENTS

GB 2487437 A * 7/2012 ............. H01S 3/067
WO WO-2007053083 A1 * 5/2007 ............... G02F 1/39

* cited by examiner

*Primary Examiner* — Daniel Petkovsek
(74) *Attorney, Agent, or Firm* — Muncy, Geissler, Olds & Lowe, P.C.

(57) ABSTRACT

A cavity-enhanced frequency mixer includes an input optical fiber, a waveguide, and an output optical fiber. The waveguide has an input end and an output end, the input end is connected to the input optical fiber, and a surface of the input end of the waveguide is coated with a highly reflective coating. The output optical fiber is formed with a fiber Bragg grating structure. The highly reflective coating and the fiber Bragg grating structure form a pair of reflective surfaces for resonant optical parametric oscillation under a low threshold situation, so that one of the beams generated by the input beam is reflected inside the partially reflective surfaces. Operated above a pump power threshold, the cavity-enhanced frequency mixer is tantamount to a compact, low-power budget optical parametric oscillator, while below the pump power threshold, it is a bright, compact, single-mode and narrow linewidth single-photon source.

15 Claims, 3 Drawing Sheets

CAVITY-ENHANCED FREQUENCY MIXER FOR CLASSICAL AND QUANTUM APPLICATIONS

BACKGROUND OF THE INVENTION

Field of the Invention

The present invention relates to a cavity-enhanced frequency mixer, and more particularly, to an optical parametric oscillator (OPO) with a wavelength-adjustable mechanism.

This present invention describes a compact, bright, single-mode and narrow-linewidth photon source for both classical and quantum applications. Such sources are often based on broadband (nm) SPDC (spontaneous parametric down conversion) and line narrowing relies then typically on the optical parametric oscillator (OPO) solution, where OPA (optical parametric amplification) is triggered by initial SPDC events carried out by a nonlinear optical material, e.g., PPLN (periodically poled lithium niobate), inside an optical cavity.

Description of the Prior Art

In classical applications, like IR spectroscopy, OPOs are operated above a certain level of input light (the pump power threshold) to achieve amplification (cavity enhancement) and narrow-line outputs at those optical frequencies simultaneously compatible with the nonlinear crystal's energy and phase matching conditions, the cavity resonances, and the application at hand.

In the context of quantum applications, the output beam must also retain the quantum features that characterize a single-photon (SP) source (i.e., neither thermal, nor coherent but instead anti-bunched); this is achieved below the pump power threshold, where the quantum nature of the initial SPDC events still prevails.

Classical, continuous wave OPO applications include spectroscopy in general and, in the NIR-MIR region, involves for instance pollution monitoring, biogas production, remote sensing, lidar. Spectrally tunable single-mode emissions in the MIR, for instance, with linewidth in the GHz range make OPO lasers a must-have for the detection of most atmospheric pollutants ($H_2O$, $CO_2$, $N_2O$ . . . ) in a large range of settings (indoor and outdoor air quality, stack gas emission, vehicles exhaust . . . ).

Quantum applications include notably quantum metrology, quantum computing and quantum communication. Regarding quantum computing & communication, optical quantum memories are important elements for quantum information processing applications such as quantum networks, quantum repeaters and linear optical quantum computing (LOQC). Quantum memories store quantum states (qubits) but also preserve entanglement, a purely quantum mechanical property that is key to data protection. SP sources, such as those based on SPDC, have proved reliable emitters of such qubits. Typical implementations of optical quantum memories are based on materials with narrow transition lines and require thus light sources with comparable linewidths. Optically controlled quantum memories of the Raman type or of the atomic frequency comb type (AFC) have now extended the range of compatible source linewidths from MHz to GHz. To mitigate the loss of photons during their travel inside optical fibers, several trials may be needed to successfully establish a link between two nodes, so that the output rate of the application at hand should benefit from higher input rates. In addition, applications built around quantum memories rely also on heralding processes of some sort (e.g., detection stages that test anti-bunching or that confirm entanglement, etc. . . . ); the incurred delays due to these measurements can again be mitigated by higher rates.

In quantum metrology applications, the idea is to push the standard quantum limit (SQL) of detection to the Heisenberg limit (HL), improving then the sensitivity beyond the shot noise limit (SNL) of interferometers or the resolution of imaging beyond the Rayleigh diffraction limit. One way to achieve that is via the creation of minimum uncertainty states (MUS) such as the so-called squeezed states. With optical squeezed states, the uncertainty on the probe photons number is increased at the expense of that of the phase (squeezing). Such squeezed states have been successfully attempted via SPDC inside an asymmetric cavity. Let's also note that it is not always possible to "saturate" the Heisenberg limit; for instance, when a specimen is too fragile to be probed by a very bright light. A viable solution is again the use of quantum light sources based on SPDC; more exactly SPDC states turned into so-called NOON ($N \geq 2$) entangled quantum states that naturally "saturate" the Heisenberg limit. These have been used advantageously in sensing, to probe the concentration of analytes or in metrology, as magnetometers based on the Faraday effect (with the non-linear crystal placed inside a resonant cavity providing the ad-hoc output bandwidth). The cavity-enhanced solution based on the OPO architecture can thus produce squeezed states and 2O02 entangled states useful for various quantum applications.

The state of the art of the OPO's resonant cavity is based either on bulky mirrors and etalon (linear or ring configurations), or on a combination of mirrors and volume Bragg grating (VBG) for frequency selection, or on a fiber-loop ring (that includes the wave-guided nonlinear element) knotted by a fiber Bragg grating (FBG). Mirrors-based cavities benefit from a high finesse and deliver thus single modes with 1-to-100 MHz linewidths, while Bragg grating solutions are limited to low GHz linewidths. The latter, in their waveguided version, are also a step-closer to photonic integrated circuits (PIC) and could even see their linewidth reduced to 1 kHz if a fibered saturable-absorber (of the kind used for passive mode-locking in lasers) is inserted.

Among the various cavity-enhanced SPDC implementations, the mirrors-based solution is well established but is not without flaws; alignment and stability issues that go with a free-space and discrete-components solution are expected. For quantum applications, to benefit from some cavity enhancement and conserve at the same time a quantum output, the device is generally operated well below the pump power threshold and results in a relatively weak brightness.

The present application is intent on improving on these aspects.

SUMMARY OF THE INVENTION

The above issues are addressed with a waveguided solution that capitalizes on its inherent stability to operate at precise pump levels and achieve a compact, single-mode light source with a linewidth in the low GHz range compatible with both classical and quantum applications. The solution seeks to offer also a brightness equal or superior to the sources currently envisioned for quantum applications, while stability allows the exploration of the quantum-classical/boundary and the definition of optimal modes of operation.

This present invention describes a compact, bright, single-mode and narrow-linewidth photon source for both classical and quantum applications. Such light sources rely typically on the optical parametric oscillator (OPO) architecture, with bulky discrete optical components, weak brightness, alignment, and stability issues.

The present application intends to improve on these aspects with a fully waveguided solution.

The present invention provides an all-fiber (no free space) or a free space solution which allows for forming narrow linewidth and single frequency optical parametric oscillations under a low threshold situation (a condition of the low threshold situation is a pump power threshold of the input beam, e.g., the pump power threshold is lower than 1 watt) using the nonlinear wavelength conversion waveguide and FBG. Compared with the conventional solid-state structures, the structure provided by the present invention is more stable and is even operable to have narrow linewidth output under degenerated bands (which, in the absence of a cavity, would typically favor broadband SPDCs). In addition, the wavelength of the output beam can be adjusted at the fabrication stage, where various SPDC's quasi phase-matching (QPM) conditions and FBG's Bragg wavelengths can be defined, as well as by the user, via the control of pump wavelengths and temperature-driven QPM conditions.

According to an embodiment of the present invention, an optical parametric oscillator (OPO) is provided. Although "cavity-enhanced frequency mixer" might be a better terminology when the device is operated below the pump power threshold, the vocable OPO is used indiscriminately in the rest of the document. The OPO comprises an input optical fiber, a waveguide, and an output optical fiber. The input optical fiber is extended along a lengthwise direction and arranged to receive an input beam. The waveguide for nonlinear wavelength conversion has an input end and an output end. The input end of the waveguide is connected to the input optical fiber, and a surface of the input end of the waveguide is coated with a reflective coating. The output optical fiber is located on one side of the waveguide opposite to the input optical fiber, wherein the output optical fiber is formed with a Fiber Bragg Grating (FBG) structure therein. The FBG within the output optical fiber is connected to the waveguide output facet through direct contact or free space coupling with filter/lens. The reflective coating and the FBG structure form a pair of reflective surfaces, so that a singly resonant OPO is formed. A first beam generated by the input beam is partially reflected at these reflective surfaces, and a second beam generated by the input beam is outputted by the output optical fiber as an output beam.

According to an embodiment of the present invention, the first beam is an idler beam, and the second beam is a signal beam.

According to an embodiment of the present invention, the first beam is a signal beam, and the second beam is an idler beam.

According to an embodiment of the present invention, the waveguide and the output optical fiber form a resonant cavity for the first beam to resonate within the waveguide.

According to an embodiment of the present invention, the waveguide is composed of Periodically Poled Lithium Niobate (PPLN) material or Periodically Poled Lithium Tantalate (PPLT) material.

According to an embodiment of the present invention, the waveguide comprises a periodical poled structure based on the target angular frequencies of the output beam.

According to an embodiment of the present invention, the waveguide is composed of two different sections arranged alternatively along the lengthwise direction with 180° phase shift.

According to an embodiment of the present invention, further comprising a first ferrule having a through hole, wherein the input optical fiber is fixed to the waveguide via the through hole of the first ferrule.

According to an embodiment of the present invention, the OPO further comprises a second ferrule with a through hole, wherein the output optical fiber is fixed to the waveguide via the through hole of the second ferrule.

According to an embodiment of the present invention, the input optical fiber is connected to a laser pump source that generates the input beam, and the power of the first beam and the second beam is adjustable according to the power of the laser pump source.

According to an embodiment of the present invention, a wavelength of the first beam and a wavelength of the second beam are tunable according to the FBG's Bragg wavelength, temperature-driven QPM conditions, and the input beam's wavelength.

According to an OPO embodiment of the present invention, the OPO further comprises a Dichroic filter located between the waveguide and the output optical fiber, the Dichroic filter is arranged to filter out the second beam and output the first beam to the output optical fiber.

According to an OPO embodiment of the present invention, the OPO further comprises a lens located between the waveguide and the output optical fiber, wherein the lens is arranged to couple the light outputted from the waveguide.

According to an embodiment of the present invention, the pump power threshold is lower than 1 watt.

DESCRIPTION OF THE PREFERRED EMBODIMENTS

Following examples are used to describe the present invention, but they are only for illustrative objectives. Those skilled in the art may readily observe that various modifications and alterations of the device and method may be made without departing from the spirit and the scope of the invention. Hence, the claimed scope of the present disclosure should be based on the claims defined hereinafter. Throughout specification and the claims, except for those further defined in the content, the meaning of the terms "a" and "the" may include the meaning of "one or at least one" element or component. Moreover, throughout the specification and claims, the singular terms may also refer to plural elements or components, unless the context clearly specifies that the plural usage is excluded. In the whole specification and claims, unless the content clearly specifies the meaning of some terms, the meaning of the term "wherein" includes the meaning of in/on something/somewhere". The meaning of each term used in the present claims and specification refers to a usual meaning known to one skilled in the art unless the meaning is additionally annotated. Some terms used to describe the present invention will be discussed to guide practitioners to realize the present invention. Further, various embodiments in the specification are not meant to limit the claimed scope of the present invention.

Furthermore, it can be understood that the terms "comprising," "including," "having," "containing," and "involving" are open-ended terms, which refer to "may include but is not limited to." In addition, each of the embodiments or claims of the present invention is not necessary to achieve all possible advantages and features. Further, the abstract and title of the present invention is used to assist the patent searching, rather than limiting the claimed scope of the present invention.

In the embodiments described below, the FBG within the output fiber is connected to the waveguide output facet through direct contact or free space coupling with filter/lens, the reflective coating and the FBG form a pair of reflective surfaces.

Figure 1A:
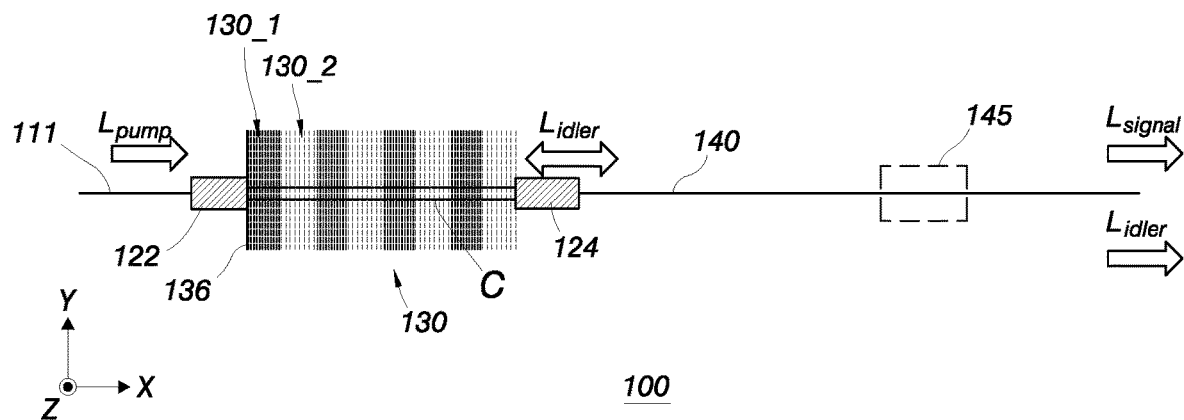
FIG. 1A is a diagram illustrating an OPO according to an embodiment of the present invention.

Please refer to FIG. 1A, which is a diagram illustrating an optical parametric oscillator (OPO) 100 according to an embodiment of the present invention. As shown in FIG. 1A, the OPO 100 comprises an input optical fiber 111, a pair of ferrules 122 and 124, a waveguide 130 (with a channel C inside) and an output optical fiber 140. The input optical fiber 111 is arranged to transmit a pumped-in beam $L_{pump}$ with an angular frequency co. The input optical fiber 111 is connected to the waveguide 130 with the aid of the first ferrule 122. Similarly, the output optical fiber 140 formed within a Fiber Bragg Grating (FBG) structure 145 is connected to the waveguide 130 with the aid of the second ferrule 124. More particularly, the arrangement of the first ferrule 122 and the second ferrule 124 is to help fix optical fibers to waveguides.

According to an embodiment of the present invention, the input optical fiber 111 may be connected to a laser pump source (not shown) that generates the input beam (i.e. pumped-in beam $L_{pump}$), and the power of the pumped-in beam $L_{pump}$ is adjustable according to the power of the laser pump source. For optically-controlled quantum memories, in which the SPDC' signal photons are read by the memory and the SPDC's idler photons propagate inside the optical fiber, useful pump wavelengths cover the entire visible light spectrum (e.g, 352, 532, 780 nm). Such scheme includes the conversion of a non-deterministic single-photon (SP) source (like those based on SPDC) into a deterministic one; the photon propagating in the fiber (or possibly free propagating) heralds the storage of its sibling by the memory, which can then be advantageously used as on-demand SP sources for linear optical quantum computing (LOQC). Another implementation are for the quantum repeaters required to mitigate losses in long-distance quantum communication; signal and idler are first entangled and memories distributed along the way secure the information via entanglement swapping (i.e., the quantum teleportation of the entanglement). In yet another implementation, storing long-lived entanglement benefits enhanced sensing and metrology. Pumps lasing in the near-IR, e.g., 1064 nm, are suitable for spectroscopy in the MIR. In the above structure, the overall transmission path contains no free-space transmissions. For example, no gap is formed between optical elements. In other words, the present invention provides an all-fiber structure without exposing the signal to the free space.

Figure 2:
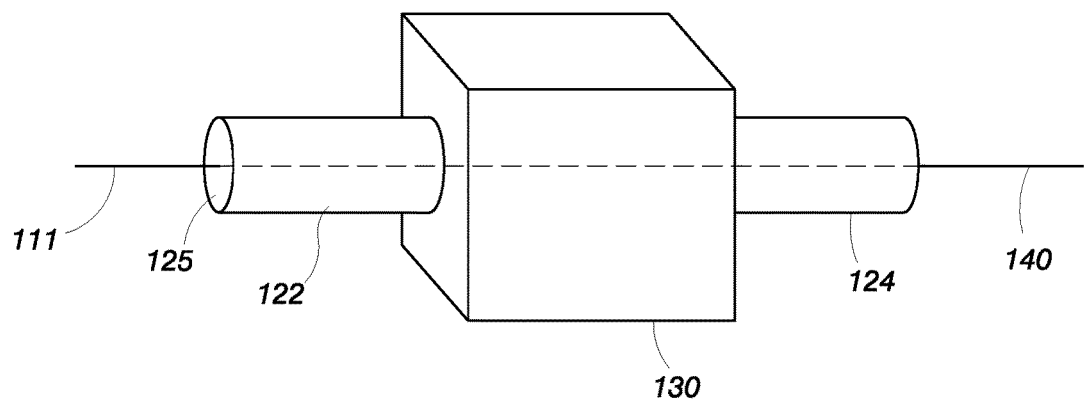
FIG. 2 illustrates the ferrules according to an embodiment of the present invention.

More specifically, please refer to FIG. 2 which illustrates the ferrules 122 and 124 according to an embodiment of the present invention. Each of the ferrules 122 and 124 has a through hole, wherein the first ferrule 122 is connected to the input end of the waveguide 130, and the second ferrule 124 is connected to the output end of the waveguide 130. The input optical fiber 111 goes through the first ferrule 122 from the opening 125 to be fixed to the waveguide 130, and the output optical fiber 140 extends out of the second ferrule 124. Since the purposes of using ferrules 122 and 124 are mainly to fix the position of the input optical fiber 111 and the output optical fiber 140, they can be omitted in some embodiments.

Refer to FIG. 1A, the surface of the input end of the waveguide 130 is coated with a reflective coating 136. The waveguide 130 may be composed of Periodically Poled Lithium Niobate (PPLN) that serves the function of adjusting the wavelength. It should be noted that the present invention is not limited to adopting PPLN as the only possible material for the waveguide 130. A singly resonant cavity is formed between the reflective coating 136 and the FBG 145, so that the first beam (i.e., idler beam $L_{idler}$) generated by the pumped-in beam $L_{pump}$ resonates therein and is then outputted by the output optical fiber 140 with the second beam (i.e., signal beam $L_{signal}$) as an output beam. Therefore, a wavelength of the first beam and a wavelength of the second beam are tunable according to the pumped-in beam's wavelength.

As long as similar optical effects can be achieved, the aforementioned PPLN can be replaced with other materials, such as Periodically Poled Lithium Tantalate (PPLT). With a suitable range of poling periods, output wavelengths from 700 nm to 5000 nm can be generated in the PPLN material. Specifically, the waveguide 130 comprises a periodical poled structure based on the targeted angular frequencies of the output beam (e.g., a combination of the idler beam $L_{idler}$ and the signal beam $L_{signal}$) and may be composed of two different sections (indicated by the numerals 130_1 and 130_2) arranged alternatively along the lengthwise direction with 180° phase shift.

The optical characteristics of the waveguide 130 are able to convert the pumped-in beam $L_{pump}$ with the angular frequency $\varphi_P$ into the aforementioned idler beam $L_{idler}$ with the angular frequency $\omega_i$ and the signal beam $L_{signal}$ with the angular frequency $\varphi_S$. The relationship between these three frequencies can be represented by: $\omega_P = \omega_S \pm \omega_i$.

The output optical fiber 140 is located on the output side of the waveguide 130, so that the reflective coating 136 of the waveguide 130 and the FBG 145 function as two highly reflective surfaces to establish the optical parameter oscillation of the OPO 100 under a low threshold situation. In one example, the idler beam $L_{idler}$ with an angular frequency $\varphi_i$ can be reflected between the reflective coating 136 and the FBG 145. The output end of the output optical fiber 140 is arranged to output the combination of the idler beam $L_{idler}$ and the signal beam $L_{signal}$ as the output beam.

Figure 1B:
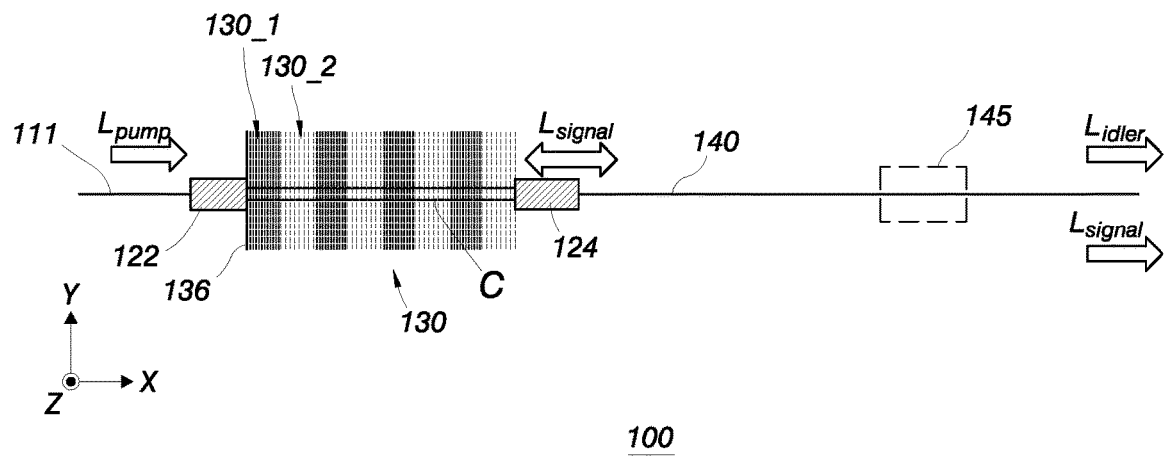
FIG. 1B is a diagram illustrating an OPO according to another embodiment of the present invention.

While the present invention can be set to output the signal beam $L_{signal}$ and retain the idler beam $L_{idler}$ as the resonant beam as shown in FIG. 1A, in some embodiments, the OPO 100 can be adjusted to do the exact opposite according to actual design considerations, as shown in FIG. 1B.

Figure 3:
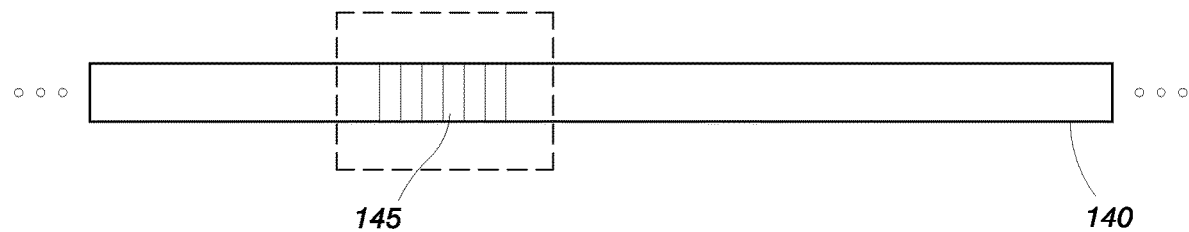
FIG. 3 illustrates an FBG structure formed in the output optical fiber according to an embodiment of the present invention.

Please refer to FIG. 3, which illustrates the FBG structure 145 formed in the output optical fiber 140 according to an embodiment of the present invention, wherein the arrangement of the FBG structure 145 is to grant the output optical fiber 140 with the high reflective characteristics. The output optical fiber 140 with the FBG structure 145 provides narrow band HR qualities. The FBG structure 145 is a kind of distributed Bragg reflector constructed in a segment of optical fiber that reflects particular wavelengths of light and transmits all others. This can be achieved by creating a periodical variation in the refractive index of the fiber core, which functions as a wavelength-specific dielectric mirror. Hence, a Fiber Bragg Grating can be used as an inline optical fiber to block certain wavelengths or it can be used as wavelength-specific reflector. Moreover, in optical communication applications, fiber Bragg gratings can be used as filters for specific single wavelengths, namely Notch Filters, or used as multiplexers of optical communications, intercepting/combining specific wavelengths.

In the above embodiment, the present invention provides an all-fiber (no free space) solution that allows the formation of optical parametric oscillations under the low threshold situation (a condition of the low threshold situation is a pump power threshold of the input beam, i.e., the pump power threshold is lower than 1 watt). Compared with the conventional solid-state structures, the structure provided by the present invention is more stable and is even operable under degenerated bands. In addition, due to the design of the two reflective surfaces (i.e. the reflective coatings 136 and the FBG 145), the present invention does not need additional lens to reach the desired reflections, thereby reducing the overall cost. In addition, the wavelength of the output beam can be adjusted by a proper waveguide design and the adjustment of the pump wavelength.

Figure 4A:
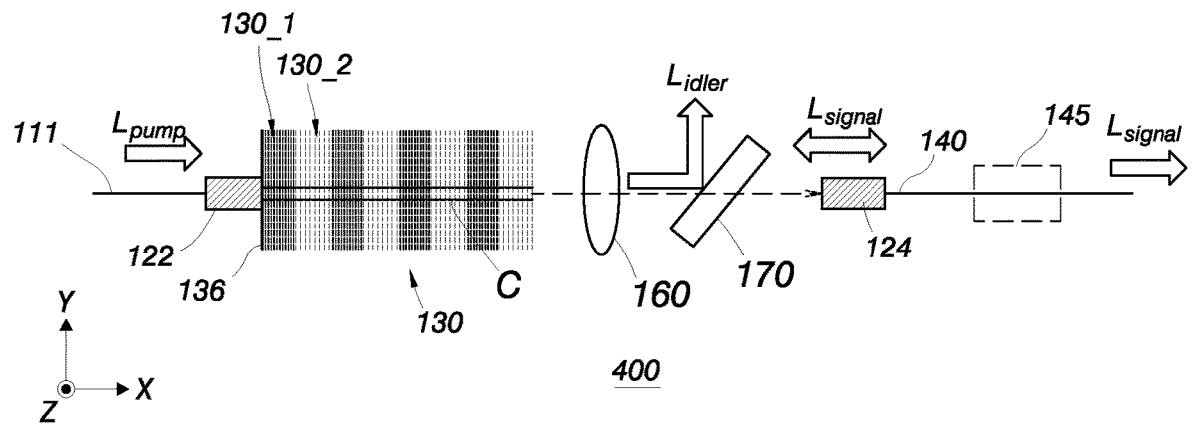
FIG. 4A is a diagram illustrating an OPO according to another embodiment of the present invention.

Despite the advantages provided by the above all-fiber (no free space), the present invention is not limited thereto. A free-space solution can be also applied when propagation conditions inside the FBG can't be satisfied for both signal and idler. Please refer to FIG. 4A, which is a diagram illustrating an optical parametric oscillator (OPO) 400 according to an embodiment of the present invention. As shown in FIG. 4A, the OPO 400 comprises an input optical fiber 111, a first ferrule 122, a waveguide 130, a lens 160, a Dichroic filter 170 and an output optical fiber 140. The input optical fiber 111 is arranged to transmit a pumped-in beam $L_{pump}$ with an angular frequency $\omega_P$.

The light outputted from the waveguide 130 is firstly processed by the lens 160, and then by the Dichroic filter 170. The lens 160 is located between the waveguide 130 and the output optical fiber 140, and is arranged to couple (i.e. concentrate) the light outputted from the waveguide 130. The Dichroic filter 170 is located between the waveguide 130 and the output optical fiber 140, the Dichroic filter 170 is arranged to filter out the idler beam $L_{idler}$ (i.e. the second beam), and output the signal beam $L_{signal}$ (i.e. the first beam). The signal beam $L_{signal}$ which passes through the Dichroic filter 170 is outputted to the output optical fiber 140 formed with the FBG structure 145 under the low threshold situation.

Figure 4B:
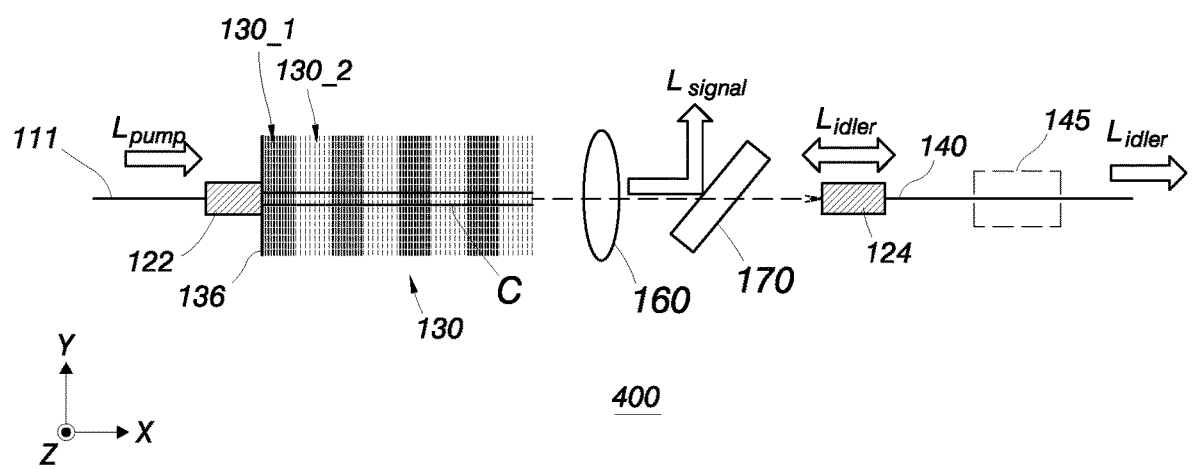
FIG. 4B is a diagram illustrating an OPO according to another embodiment of the present invention.

While the present invention can be set to output the signal beam $L_{signal}$ while the idler beam $L_{idler}$ is filtered out as shown in FIG. 4A, in some embodiments, the OPO 400 can be adjusted to do the exact opposite according to actual design considerations, as shown in FIG. 4B.

According to the above, when the pump power of the input beam operates below the pump power threshold, the OPO is in quantum application, while when the pump power of the input beam operates above the pump power threshold, the OPO is in classical application.

What is claimed is:

1. A cavity-enhanced frequency mixer, comprising:
    an input optical fiber extended along a lengthwise direction, and arranged to receive an input beam;
    a waveguide, for nonlinear wavelength conversion, wherein the waveguide has an input end and an output end, the input end of the waveguide is connected to the input optical fiber to receive the input beam, and a surface of the input end of the waveguide is coated with a reflective coating;
    and an output optical fiber, located on one side of the waveguide opposite to the input optical fiber, wherein the output optical fiber is formed with a Fiber Bragg Grating (FBG) structure therein;
    wherein the reflective coating and the FBG structure form a pair of reflective surfaces for singly resonant optical parametric oscillation under a low threshold situation, a condition of the low threshold situation is a pump power threshold of the input beam, so that a first beam generated by the input beam is reflected there between and is then outputted by the output optical fiber as an output beam, and a second beam generated by the input beam directly passes through the waveguide without reflection;
    wherein when the pump power of the input beam operates below the pump power threshold, the cavity-enhanced frequency mixer is in quantum application, and when the pump power of the input beam operates above the pump power threshold, the cavity-enhanced frequency mixer is in classical application.

2. The cavity-enhanced frequency mixer according to claim 1, wherein the first beam is an idler beam, and the second beam is a signal beam.

3. The cavity-enhanced frequency mixer according to claim 1, wherein the first beam is a signal beam, and the second beam is an idler beam.

4. The cavity-enhanced frequency mixer according to claim 1, wherein the waveguide and the output optical fiber form a resonant cavity either;
    for the first beam only to resonate within the waveguide;
    or for the second beam only to resonate within the waveguide.

5. The cavity-enhanced frequency mixer according to claim 1, wherein the waveguide is composed of Periodically Poled Lithium Niobate (PPLN) material or Periodically Poled Lithium Tantalate (PPLT) material.

6. The cavity-enhanced frequency mixer according to claim 5, wherein the waveguide comprises a periodical poled structure based on a target angular frequency of the output beam.

7. The cavity-enhanced frequency mixer according to claim 6, wherein the waveguide is composed of two different sections arranged alternatively along the lengthwise direction with 180° phase shift.

8. The cavity-enhanced frequency mixer according to claim 1, further comprising a first ferrule having a through hole, wherein the input optical fiber is fixed to the waveguide via the through hole of the first ferrule.

9. The cavity-enhanced frequency mixer according to claim 8, further comprising a second ferrule having a through hole, wherein the output optical fiber is fixed to the waveguide via the through hole of the second ferrule.

10. The cavity-enhanced frequency mixer according to claim 1, wherein the second beam directly passing through the waveguide is outputted by the output optical fiber with the first beam as the output beam.

11. The cavity-enhanced frequency mixer according to claim 1, wherein the input optical fiber is connected to a laser pump source that generates the input beam, and the power of the first beam and the power of the second beam are adjustable according to the power of the laser pump source.

12. The cavity-enhanced frequency mixer according to claim 1, wherein a wavelength of the first beam and a wavelength of the second beam are tunable according to the FBG's Bragg wavelength, the temperature-driven QPM conditions, and the input beam's wavelength.

13. The cavity-enhanced frequency mixer according to claim 1, further comprising a Dichroic filter located between the waveguide and the output optical fiber, the Dichroic filter is arranged to filter out the second beam and output the first beam to the output optical fiber.

14. The cavity-enhanced frequency mixer according to claim 1, further comprising a lens located between the waveguide and the output optical fiber, wherein the lens is arranged to couple light outputted from the waveguide.

15. The cavity-enhanced frequency mixer according to claim 1, wherein the pump power threshold is lower than 1 watt.

\* \* \* \* \*